(12) United States Patent
Komiyama

(10) Patent No.: US 11,347,017 B2
(45) Date of Patent: May 31, 2022

(54) LENS UNIT

(71) Applicant: NIDEC SANKYO CORPORATION, Nagano (JP)

(72) Inventor: Tadashi Komiyama, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 455 days.

(21) Appl. No.: 16/256,292

(22) Filed: Jan. 24, 2019

(65) Prior Publication Data
US 2019/0235193 A1  Aug. 1, 2019

(30) Foreign Application Priority Data

Jan. 29, 2018  (JP) .............................. JP2018-012211
Nov. 30, 2018  (JP) .............................. JP2018-225065

(51) Int. Cl.
*G02B 7/02* (2021.01)
*G02B 13/06* (2006.01)
*B29D 11/00* (2006.01)
*G02B 9/62* (2006.01)

(52) U.S. Cl.
CPC .......... *G02B 7/021* (2013.01); *B29D 11/0073* (2013.01); *G02B 9/62* (2013.01); *G02B 13/06* (2013.01)

(58) Field of Classification Search
None
See application file for complete search history.

(56) References Cited

U.S. PATENT DOCUMENTS

| | | | | |
|---|---|---|---|---|
| 8,526,129 B2 * | 9/2013 | Hirata | .................... | G02B 7/021 359/819 |
| 2015/0323708 A1 * | 11/2015 | Hashimoto | .............. | G02B 7/02 359/718 |
| 2016/0349475 A1 * | 12/2016 | Horiuchi | .................. | G02B 9/34 |
| 2018/0031803 A1 * | 2/2018 | Shirotori | ................ | G02B 7/026 |
| 2018/0088297 A1 * | 3/2018 | Komiyama | ........ | G02B 27/0025 |
| 2019/0310438 A1 * | 10/2019 | Komiyama | ............ | G02B 13/04 |

FOREIGN PATENT DOCUMENTS

JP        2005140848 A     6/2005

* cited by examiner

*Primary Examiner* — Christopher Stanford
*Assistant Examiner* — Journey F Sumlar
(74) *Attorney, Agent, or Firm* — Cantor Colburn LLP

(57) ABSTRACT

A lens unit may include a plurality of lenses; and a cylindrical holder. The plurality of lenses may include a cemented lens having a second lens element bonded to a first lens element with an adhesive layer interposed therebetween. The first lens element may be a plastic lens having a convex lens surface and a first flange unit at an outer peripheral side. The second lens element may be a plastic lens having a concave lens surface bonded by the adhesive layer onto the convex lens surface of the first lens element and a second flange unit at an outer peripheral side. One of the first and second lens elements may be in contact with the holder, and the may not be in contact with the holder. The first and second cemented lens elements may include an optical axial direction abutment surface and a radial direction abutment surface.

16 Claims, 7 Drawing Sheets

$T/C \leq 3.0 \cdots (1)$
$T1/C \leq 1.5 \cdots (2)$

LENS UNIT

CROSS REFERENCE TO RELATED APPLICATION

The present application claims priority under 35 U.S.C. § 119 to Japanese Applications No. 2018-012211 filed Jan. 29, 2018; and No. 2018-225065, filed on Nov. 30, 2018; the entire contents of which are incorporated herein by reference.

BACKGROUND

At least an embodiment of the present invention relates to a lens unit, and more particularly relates to a lens unit including a cemented lens obtained by bonding two lenses with an adhesive.

In the recent camera market, there has been an increasing demand for an on-vehicle sensing camera, a high pixel monitoring camera, and the like, and a smaller camera with a higher performance is requested. Therefore, it is essential to improve the performance of these lens units, and various technologies have been proposed (see, Japanese Unexamined Patent Application Publication. No. 2005-140848 (hereinafter, referred to as PTL 1), for example).

In the technology disclosed in PTL 1, a lens unit where resolution deterioration is suppressed while achieving a reduction in size has been proposed. Specifically, in order to laminate two lenses (a first lens and a second lens), a direction parallel to an optical axial direction and a direction perpendicular thereto are surely positioned while ensuring that the two lenses are easily fitted by forming a fitting unit in a cylindrical shape.

Incidentally, in a lens unit, in order to satisfactorily correct various types of aberrations (in particular, chromatic aberration), a cemented lens obtained by bonding plastic lenses to each other is often arranged. In the cemented lens, bonding surfaces (lens surfaces) are bonded together with an adhesive, but in order to prevent an adhesive layer from being peeled off, it is required to provide a gap between the bonding surfaces. Presence of the gap makes it difficult to suppress a certain amount or more of misalignment of lenses and there is a concern that improvement of the optical performance may be hindered, and thus, a countermeasure technology has been demanded.

SUMMARY

At least an embodiment of the present invention has been made in view of the above circumstances, and at least an embodiment provides a technology for suppressing an optical performance deterioration caused due to an adhesive layer used for bonding lenses in a cemented lens used for a lens unit.

At least an embodiment of the present invention is a lens unit including: a plurality of lenses; and a cylindrical holder configured to hold the plurality of lenses, and the plurality of lenses include a cemented lens obtained by bonding a second cemented lens element to a first cemented lens element with an adhesive layer interposed therebetween, the first cemented lens element is a plastic lens including a convex lens surface facing a side of the second cemented lens element, and a first flange unit surrounding the convex lens surface at an outer peripheral side, the second cemented lens element is a plastic lens including a concave lens surface bonded by the adhesive layer onto the convex lens surface of the first cemented lens element, and a second flange unit surrounding the concave lens surface at an outer peripheral side, one of the first cemented lens element and the second cemented lens element is in contact with the holder and the other is not in contact with the holder, and the first cemented lens element and the second cemented lens element include, in the first flange unit and the second flange unit, an optical axial direction abutment surface for positioning in the optical axial direction and a radial direction abutment surface for positioning in a radial direction.

With such a configuration, the first cemented lens element and the second cemented lens element are positioned by the optical axial direction abutment surface and the radial direction abutment surface, and thus, the occurrence of misalignment of lenses by the gap (portion of the adhesive layer) can be suppressed and the optical performance can be improved. In addition, one of the first cemented lens element and the second cemented lens element is in contact with the holder (lens barrel) and the other is not in contact with the holder, and thus, when fixing the cemented lens to the holder, separate forces act on the first cemented lens element and the second cemented lens element, allowing for suppression of misalignment of lenses caused by the gap (portion of the adhesive layer) and suppression of occurrence of peeling of adhesives (balsam break) caused by the misalignment.

The optical axial direction abutment surface and the radial direction abutment surface formed on the first flange unit of the first cemented lens element are comprised of a protruding unit, and the optical axial direction abutment surface and the radial direction abutment surface formed on the second flange unit of the second cemented lens element are comprised of a stepped unit.

When the protruding unit is provided on the first cemented lens element (side on which the convex lens surface is provided), it is possible to increase the thickness in the axial direction of the first flange unit. Therefore, occurrence of a sink on the convex lens surface (apex portion) of the first cemented lens element can be prevented.

The radial direction abutment surface is comprised of an inclined surface (tapered surface).

As the radial direction abutment surface, the inclined surfaces (tapered surfaces) are formed on the first cemented lens element and the second cemented lens element, respectively, to abut on each other when the first cemented lens element and the second cemented lens element are bonded, and thus it is possible to facilitate the positioning during a bonding operation.

The first cemented lens element satisfies a conditional expression of $T/C \leq 3.0$, where T denotes a lens thickness and C denotes a flange thickness.

When T/C exceeds an upper limit (3.0), a distance between a gate and an apex portion of the convex lens surface is long during injection molding of the first cemented lens element being a plastic lens, and thus, an injection pressure hardly reaches, as a result of which there is a concern that a fine sink may occur. When such a conditional expression is satisfied, occurrence of the sink on the convex lens surface (in particular, the apex portion) of the first cemented lens element can be suppressed.

The first cemented lens element satisfies a conditional expression of $T1/C \leq 1.5$, where T1 denotes a protrusion amount of the convex lens surface and C denotes a flange thickness.

When T1/C exceeds an upper limit (1.5), a distance between a gate and an apex portion of the convex lens surface is long during injection molding of the first cemented lens element being a plastic lens, and thus, an injection pressure hardly reaches, as a result of which there is a concern that a fine sink may occur. When such a conditional expression is satisfied, occurrence of the sink on the convex lens surface (in particular, the apex portion) of the first cemented lens element can be suppressed.

The optical axial direction abutment surface and the radial direction abutment surface are the same mirror plane as the convex lens surface or the concave lens surface.

When the optical axial direction abutment surface and the radial direction abutment surface are the same mirror plane as the lens surface, variations can be suppressed. That is, it is possible to realize a highly accurate cemented lens.

An adhesive reservoir unit is formed radially outside of the optical axial direction abutment surface and the radial direction abutment surface.

Provision of the adhesive reservoir unit can prevent a case where the adhesive leaks to a flange side surface to cause misalignment when the cemented lens is fitted into the lens barrel.

The adhesive reservoir unit is a region sandwiched among the optical axial direction abutment surface, the first flange unit, and the second flange unit, and a level difference is provided on at least any one of a surface of the first flange unit and a surface of the second flange unit in the region.

In this way, when the level difference is created on the surface of the flange in the adhesive reservoir unit, an adhesive before solidification can be further suppressed from being leaked from the adhesive reservoir unit to the flange side surface side.

A thickness of the adhesive layer formed between the first cemented lens element and the second cemented lens element is in a range of 5 to 30 μm in a region in which the convex lens surface and the concave lens surface are bonded, in a range of 10 to 50 μm in a region in which the first flange unit and the second flange unit are bonded, radially outside of a region in which the convex lens surface and the concave lens surface are bonded and radially inside of the optical axial direction abutment surface and the radial direction abutment surface, and in a range of 100 to 300 μm in the adhesive reservoir unit.

If the adhesive reservoir unit is provided as described above, a sufficient amount of adhesive is supplied to form a thin adhesive layer without a gap in a region where the convex lens surface and the concave lens surface are bonded to realize that the thickness of the adhesive layer in this portion is in a range of 5 to 30 μm. At this time, as a result of passing a surplus adhesive before solidification radially outward, when a thickness of the adhesive layer in the outer region where the first flange unit and the second flange unit are bonded is in a range of 10 to 50 μm, and further, when a thickness of the adhesive layer in the adhesive reservoir unit outside the above region is increased sufficiently, that is, in a range of 100 to 300 μm, it is possible to satisfactorily realize the bonding between the convex lens surface and the concave lens surface and to prevent the adhesive before solidification from being leaked to the flange side surface side or the like.

A position at which the optical axial direction abutment surface in the first cemented lens element contacts the optical axial direction abutment surface in the second cemented lens element and a position at which the radial direction abutment surface in the first cemented lens element contacts the radial direction abutment surface in the second cemented lens element are each provided at a plurality of positions respectively spaced apart in a peripheral direction.

When, in the first cemented lens element and the second cemented lens element, the plurality of position at which the optical axial direction abutment surfaces and the radial direction abutment surfaces abut are provided to be kept apart, it is possible to determine a positional relationship in the optical axial direction and the radial direction between the first cemented lens element and the second cemented lens element. On the other hand, at positions except where these surfaces are in contact with each other, it is possible to pass the surplus adhesive before solidification from the radially inside direction to the outside direction to facilitate guiding of the adhesive to the adhesive reservoir unit.

The first cemented lens element is arranged on an object side relative to the second cemented lens element.

The holder is provided with a hole unit with an inner peripheral surface of a substantially cylindrical shape where the optical axis serves as a central axis, and on the inner peripheral surface, a plurality of press-fit convex units protruding toward the optical axis side and extending in the optical axial direction are formed in a peripheral direction, in the hole unit, when an outer peripheral surface of one of the first cemented lens element and the second cemented lens element in contact with the holder is locked to the plurality of press-fit convex units, the first cemented lens element and the second cemented lens element are fixed to the holder.

When the cemented lens configured by bonding the first cemented lens element and the second cemented lens element is housed and fixed in the hole unit of the lens barrel (holder), a plurality of press-fit convex units are provided and kept apart on an inner peripheral surface of the hole unit and an outer peripheral surface of one of the first cemented lens element and the second cemented lens element is locked so that it is possible to suppress misalignment of the cemented lens with respect to the lens barrel. Even if the adhesive adheres to a part of the outer peripheral surface, it is possible to reduce an adverse influence resulting therefrom.

According to at least an embodiment of the present invention, it is possible to provide a technology for suppressing deterioration of an optical performance caused by an adhesive layer used for bonding cemented lenses in a cemented lens used for a lens unit.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

A mode for carrying out the invention (hereinafter referred to as "embodiment") will be described with reference to the drawings, below.

Figure 1:
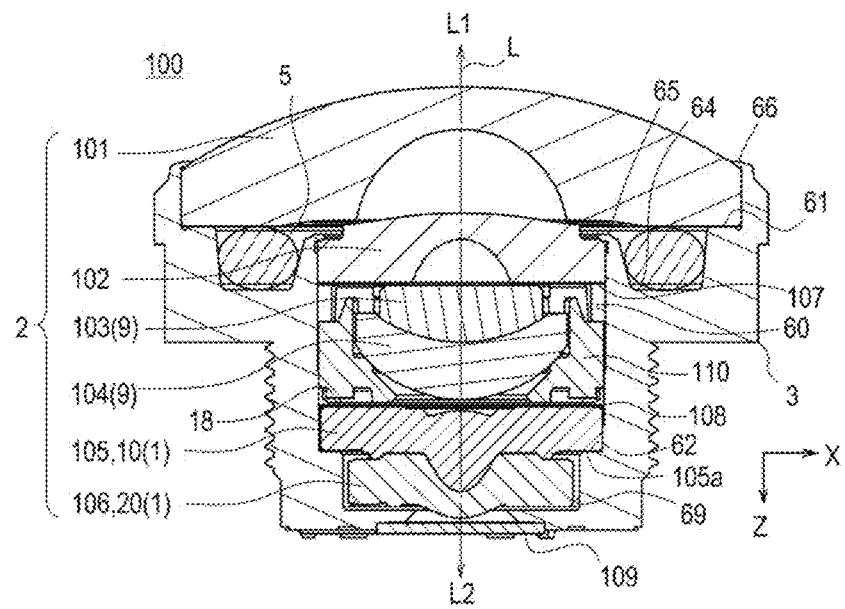
FIG. 1 is a vertical sectional view of an entire lens unit according to an embodiment.

FIG. 1 is a vertical sectional view (X-Z sectional view) of an entire lens unit 1 according to the present embodiment. The lens unit 1 is a lens assembly incorporated in an on-vehicle camera monitoring a vehicle periphery, a surveillance camera, a door phone, and the like. It is noted that in the present embodiment, "object side L1" and "image side L2" refer to an object side and an image side in an optical axis L direction, and the "optical axial direction" is a direction parallel to an optical axis L. It is noted that a Z-axis–direction side in an X-Y-Z axis direction in the figure corresponds to the object side L1, and a Z axis+direction side corresponds to the image side L2.

(Overall Configuration)

A lens unit 100 includes a wide-angle lens 2 including a plurality of lenses and a lens barrel (holder) 3 configured to house the wide-angle lens 2.

The wide-angle lens 2 is configured by six lenses, that is, a first lens 101, a second lens 102, a third lens 103, a fourth lens 104, a fifth lens 105, and a sixth lens 106 arranged along the optical axis L from the object side L1 to the image side L2. It is noted that in the present embodiment, between the second lens 102 and the third lens 103, a light shielding sheet 107 configured to prevent light from entering the image side is arranged in close contact. Further, between the fourth lens 104 and the fifth lens 105 (lens holder 110), a diaphragm 108 is arranged in close contact. An infrared cutoff filter 109 is attached to an opening of the lens barrel 3 on the image side L2 to face the sixth lens 106.

Among the lenses configuring the wide-angle lens 2, the first lens 101 is arranged closest to the object side L1. The second lens 102 is located on the image side L2 of the first lens 101. The third lens 103 is located on the image side L2 of the second lens 102. The fourth lens 104 is located on the image side of the third lens 103. The fifth lens 105 is located on the image side L2 of the fourth lens 104. The sixth lens 106 is located on the image side L2 of the fifth lens 105. The fifth lens 105 and the sixth lens 106 are a first cemented lens (hereinafter simply referred to as "cemented lens 1"). In addition, the third lens 103 and the fourth lens 104 are a second cemented lens 9. Therefore, a lens surface on the image side of the third lens 103 and a lens surface on the object side of the fourth lens 104 are bonded together with an adhesive layer interposed therebetween. It is noted that the fourth lens 104 is arranged in the lens barrel 3 in a state where the fourth lens 104 is press-fittingly fixed to the lens holder 110 made of resin and further fixed while being reinforced with an adhesive. On the other hand, the third lens 103 is not in contact with the lens holder 110 and the lens barrel 3.

In the present embodiment, the cemented lens 1 has a characteristic, and the fifth lens 105 and the sixth lens 106 configuring the cemented lens 1 will be described as a first cemented lens element 10 and a second cemented lens element 20, respectively.

In the present embodiment, plastic lenses are used for the first lens 101, the second lens 102, the fifth lens 105, and the sixth lens 106 from a viewpoint of excellence in processability and economy of the lens. Glass lenses are used for the third lens 103 and the fourth lens 104 from a viewpoint of excellent optical characteristics such as a lens surface accuracy and a refractive index depending on a temperature change.

Although the wide-angle lens 2 of the lens unit 100 in the present embodiment is configured of the above six lenses, the number of lenses is not limited and a material of the lens is not limited, either. For example, from a viewpoint of a characteristic that the object side lens surface of the first lens 101 is not easily damaged even when the object side lens surface of the first lens located closest to the object side L1 is exposed, the glass lens may be used for the first lens 101. In addition, although the third lens 103 and the fourth lens 104 are the second cemented lens 9, the third lens 103 and the fourth lens 104 may be configured of a single lens.

The lens barrel 3 is a cylindrical lens frame made of resin, includes a hole unit configured to house and fix the wide-angle lens 2, and inside the hole unit, an inner peripheral surface 60 is formed toward the image side, along the outer peripheral surface of each lens configuring the wide-angle lens 2. On the image side L2 side of the inner peripheral surface 60, a sixth-lens housing unit 69 smaller in diameter than the inner peripheral surface 60, where the sixth lens 106 (second cemented lens element 20) is housed therein, is formed.

As will be described later, the inner peripheral surface 60 is formed with a plurality of press-fit convex units (ribs) in a convex shape (expanded shape) in a radially inside direction, at equal intervals in the peripheral direction. Of the lenses configuring the wide-angle lens 2, when the second lens 102, the lens holder 110 (the third lens 103, the fourth lens 104), and the fifth lens 105 (the first cemented lens element 10) are press-fitted in the press-fit convex units on the inner peripheral surface 60, these lenses are positioned in a radial direction. That is, the press-fit convex units function as press-fit holding units of the second lens 102, the lens holder 110, and the fifth lens 105.

Further, a flat unit 105a (peripheral edge region of an image-side flange outer peripheral surface 14 of the first cemented lens element 10, which will be described later) formed on a peripheral edge of the surface of the image side L2 in the fifth lens 105 is mounted on an annular flat unit 62 (boundary stepped unit between the inner peripheral surface 60 and the sixth-lens housing unit 69) extending inward in the peripheral direction on the image side L2 of the lens barrel 3. On the other hand, the sixth lens 106 is not in contact with the lens barrel 3.

Further, a flat unit formed on the surface on the image side L2 in the lens holder 110 is mounted on an object-side flange outer peripheral surface 18 of the first cemented lens element 10, with the diaphragm 108 interposed therebetween. A flat unit formed on the surface on the image side L2 in the second lens 102 is mounted on the flat unit formed on the object side L1 of the lens holder 110, with the light shielding sheet 107 interposed therebetween. The peripheral edge of the surface on the object side L1 of the second lens 102 is locked with a caulking unit 65 provided at an end unit of an object-side inner peripheral surface of the lens barrel 3.

As a result, the second lens 102, the lens holder 110 (the third lens 103, the fourth lens 104), the fifth lens 105, and the sixth lens 106 are positioned in the optical axis L direction.

Further, after an O ring 5 is mounted on an annular groove unit 64 formed on the surface on the object side of the lens barrel 3, the first lens 101 is mounted on the O ring 5, and the peripheral edge of the first lens 101 is locked with a caulking unit 66 provided at an object side end unit of the lens barrel 3 while the first lens 101, which is pressed against the image side L2, is mounted on a lens arrangement surface 61. In this way, the first lens 101 is positioned in the optical axis L direction.

Here, from a viewpoint of preventing errors in an insertion order of the second lens 102, the lens holder 110 (the third lens 103, the fourth lens 104), the fifth lens 105, and the sixth lens 106, the nearer the lens relative to the image side L2, the smaller an outer diameter, and the inner peripheral surface 60 is formed narrower correspondingly.

(Cemented Lens)

Figure 2:
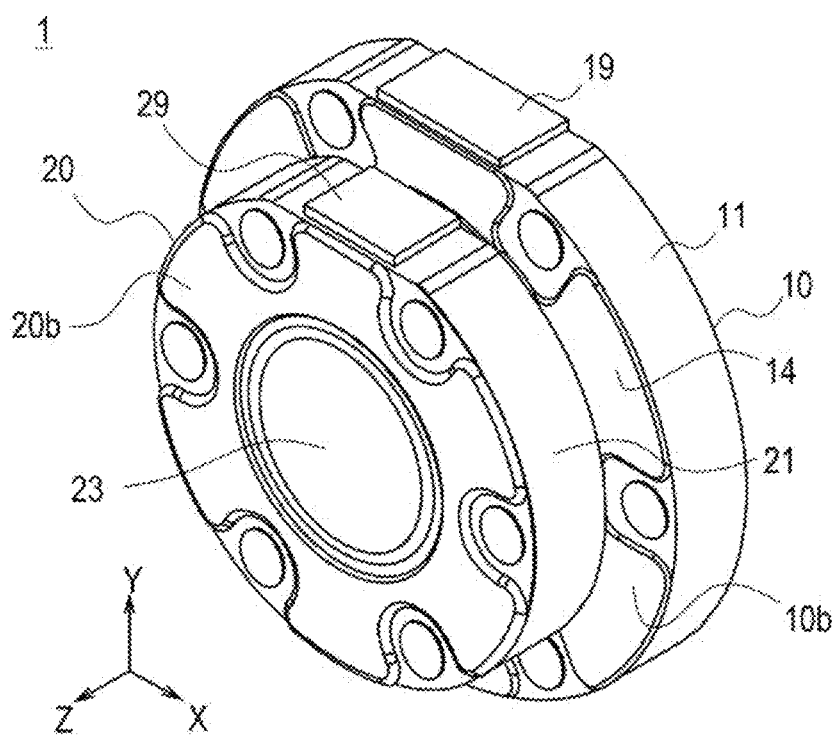
FIG. 2 is a perspective view of a cemented lens according to the embodiment.
Figure 3:
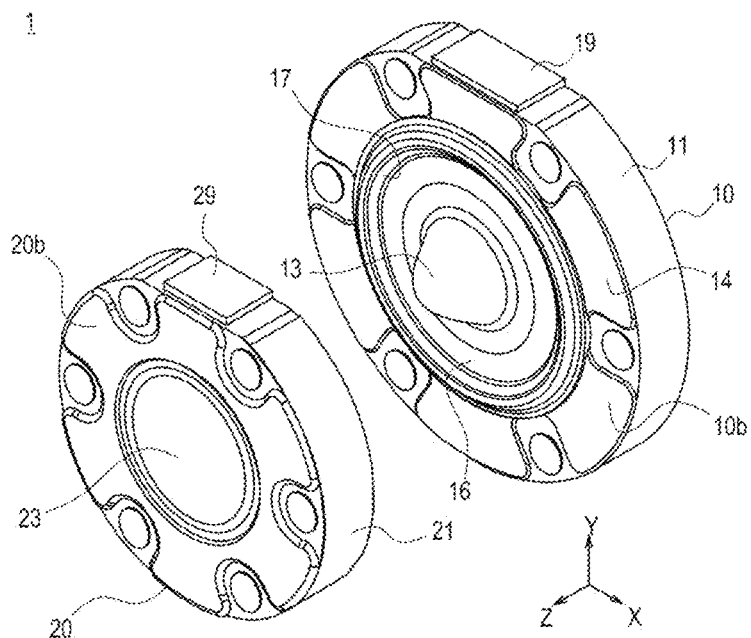
FIG. 3 is an exploded perspective view of a cemented lens according to the embodiment.
Figure 4:
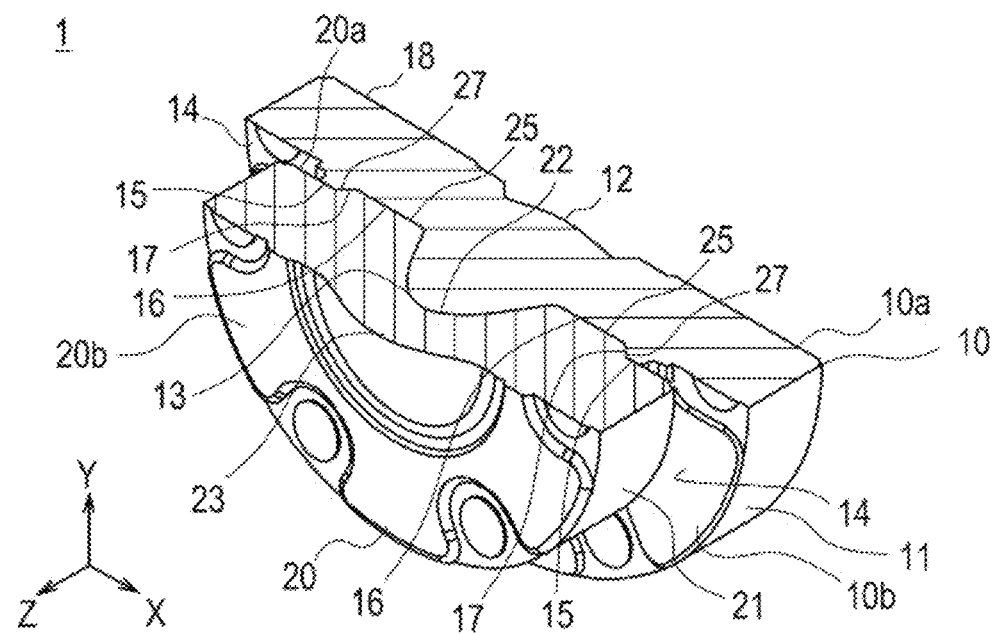
FIG. 4 is a cross-sectional perspective view of a cemented lens according to the embodiment.
Figure 5:
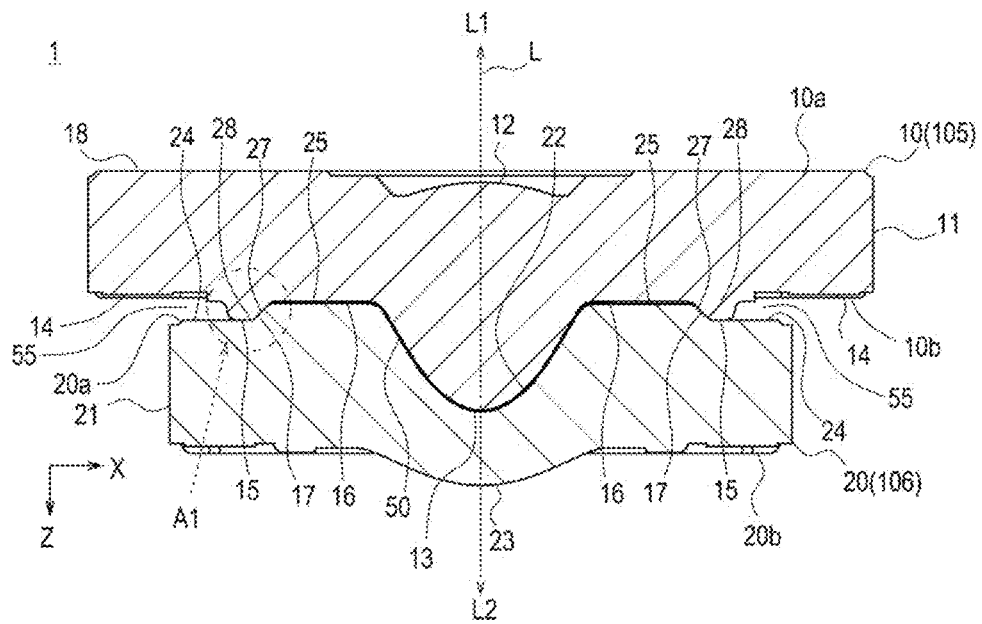
FIG. 5 is a sectional view of a cemented lens according to the embodiment.
Figure 6:
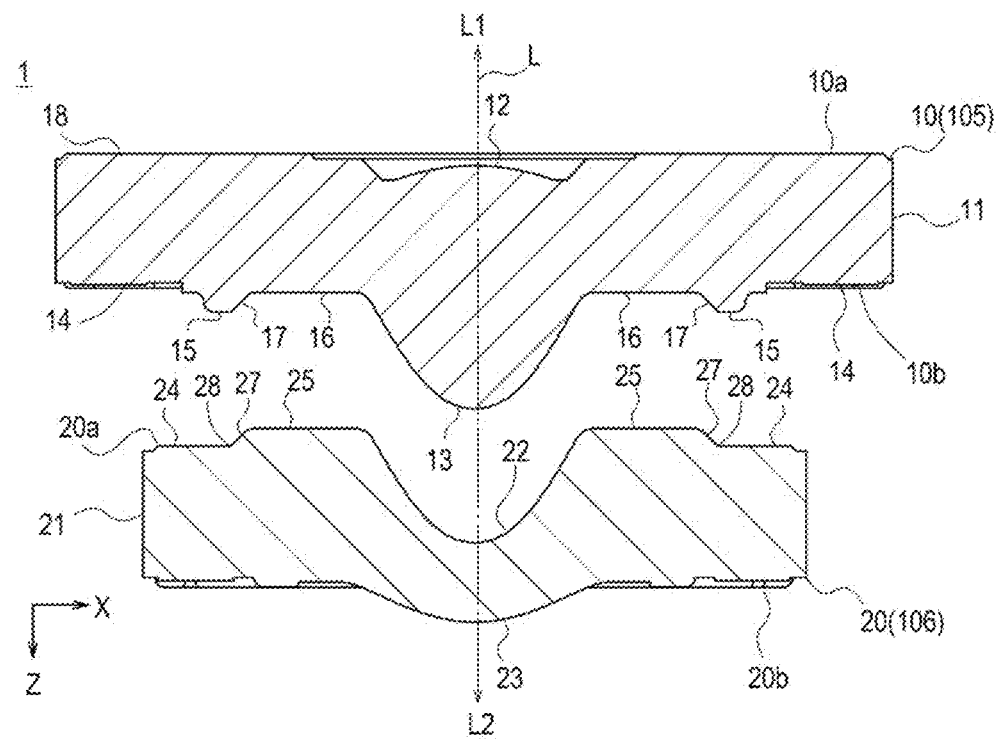
FIG. 6 is a sectional view of a cemented lens in a separated state according to the embodiment.
Figure 7:
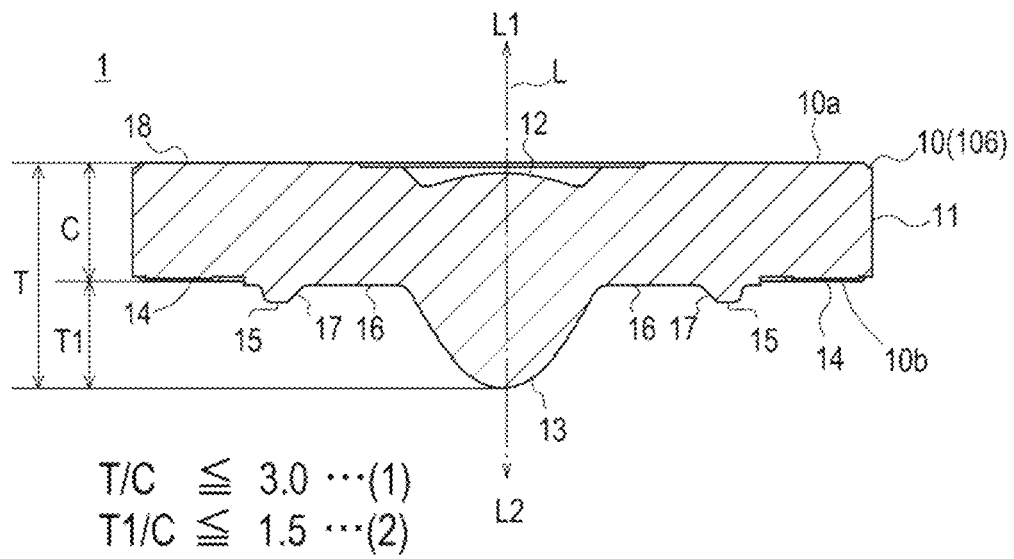
FIG. 7 is a diagram for explaining a condition of a shape of a first cemented lens element according to the embodiment.
Figure 8:
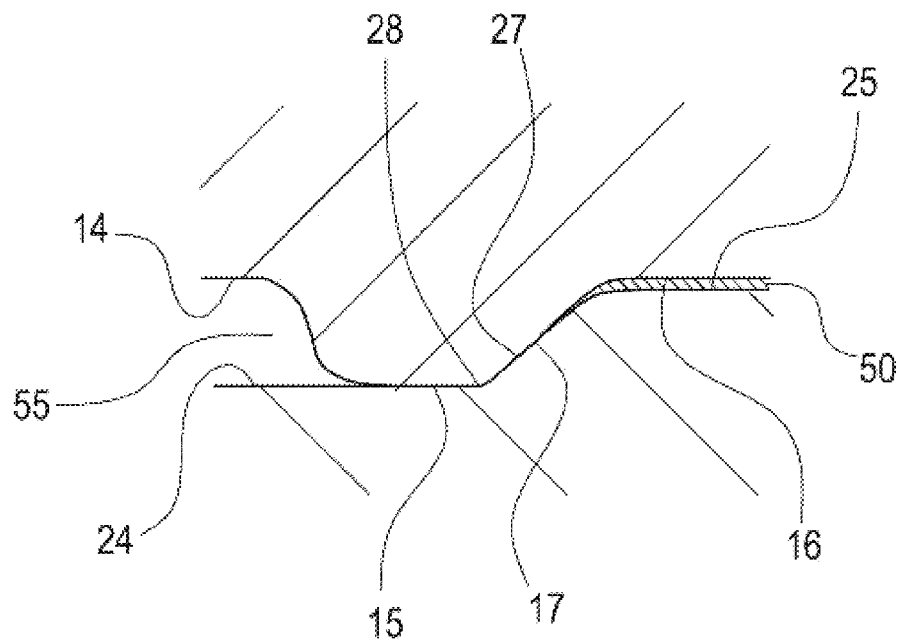
FIG. 8 is an enlarged view of a region A1 in FIG. 5 according to the embodiment.

Next, with reference to FIG. 2 to FIG. 8, the cemented lens 1 will be described. FIG. 2 is a perspective view of the cemented lens 1. FIG. 3 is an exploded perspective view of the cemented lens 1. FIG. 4 is a cross-sectional perspective view of the cemented lens 1, where an X-Z cross section is illustrated. FIG. 5 is a sectional view (X-Z sectional view) of the cemented lens 1, and FIG. 6 is a sectional view of the cemented lens 1 in a separated state. FIG. 7 is a diagram for explaining a condition of a shape of the first cemented lens element 10. FIG. 8 is an enlarged view of a region A1 in FIG. 5.

As described above, in the cemented lens 1, the first cemented lens element 10 (fifth lens 105) on the object side L1 and the second cemented lens element 20 (sixth lens 106) on the image side L2 are bonded with an adhesive (adhesive layer 50; see FIG. 5 and FIG. 8). Flange units 11, 21 of the first cemented lens element 10 and the second cemented lens element 20 are each formed with gate units 19, 29 corresponding to gate openings of an injection molding die used when each of the first cemented lens element 10 and the second cemented lens element 20 is molded.

Here, the first cemented lens element 10 has a larger diameter than the second cemented lens element 20. That is, in the cemented lens 1 where the first cemented lens element 10 and the second cemented lens element 20 are bonded, the first cemented lens element 10 is in contact with, that is, fixed to the lens barrel 3 when being fixed to the lens barrel 3, as described above, and the second cemented lens element 20 is housed while being not in contact with the sixth-lens housing unit 69 (FIG. 1).

In addition, a second convex lens surface 13 of the first cemented lens element 10 is bonded in a configuration of being fitted into the concave lens surface 22 of the second cemented lens element 20. It is noted that the second convex lens surface 13 and the concave lens surface 22 do not directly abut with each other because the adhesive layer 50 is interposed therebetween, and are positioned by a structure in which below-described flange convex unit 15 and stepped unit 28 abut with each other.

The first cemented lens element 10 is a plastic lens including a first convex lens surface 12 facing the object side L1, an opposite second convex lens surface 13 being a convex lens surface facing a side of the second cemented lens element 20 (in this case, the image side L2), and a first flange unit (flange unit 11) surrounding the first convex lens surface 12 and the second convex lens surface 13 at an outer peripheral side thereof.

More specifically, in a center portion on an object side surface 10a of the object side L1, the first convex lens surface 12 is formed. Here, an apex portion of the first convex lens surface 12 is inward of the object side surface 10a, and does not protrude.

In a center portion of an image side surface 10b, a second convex lens surface 13 projecting to a side of the second cemented lens element 20, that is, the image side L2, is formed. The second convex lens surface 13 is fitted into the concave lens surface 22 of the second cemented lens element 20 and fixed with an adhesive (adhesive layer 50). The adhesive layer 50 is formed to a fitting region of the second convex lens surface 13 and the concave lens surface 22 and a region where a below-described image-side flange inner peripheral surface 16 and object-side flange inner peripheral surface 25 face each other (flange facing region). The adhesive layer 50 is applied to the concave lens surface 22 and when the second convex lens surface 13 is fitted into the concave lens surface 22 to form the thin and uniform adhesive layer 50, and the adhesive layer 50 in the fitting region has a thickness of several microns and the adhesive layer 50 in the flange region has a thickness of several tens of microns.

Further, the flange unit 11 surrounding the second convex lens surface 13 on the outer periphery side is provided with the annular flange convex unit 15 being a protruding unit protruding toward the concave lens surface 22 side at a position apart from a boundary position of the second convex lens surface 13 by a predetermined length. A region on the radially outside of the flange convex unit 15 is referred to as the "image-side flange outer peripheral surface 14", and a region on the radially inside thereof is referred to as the "image-side flange inner peripheral surface 16". A side surface on the radially inside of the flange convex unit 15 is a tapered surface 17 being an inclined surface formed obliquely downward in the radially outside direction. That is, the tapered surface 17 is a surface connecting the image-side flange inner peripheral surface 16 and the flange convex unit 15, and is an inclined surface expanding from the image-side flange inner peripheral surface 16 toward the flange convex unit 15.

It is noted that as illustrated in FIG. 7, the second convex lens surface 13 of the first cemented lens element 10 satisfies the following conditional expressions (1), and (2). That is, in the first cemented lens element 10, when T (=T1+C) denotes a lens thickness, T1 denotes a protrusion amount of the second convex lens surface 13, and C denotes a flange thickness, the following conditional expressions are satisfied:

$$T/C \leq 3.0 \qquad \text{Conditional expression (1)}$$

$$T1/C \leq 1.5 \qquad \text{Condition expression (2)}$$

In at least an embodiment, both the conditional expressions (1), (2) are satisfied, but in at least another embodiment, only one of the conditional expressions may be satisfied.

If the conditional expressions (1), (2) are not satisfied and upper limits thereof are exceeded, at the time of injection molding of the first cemented lens element 10 that is a plastic lens, a distance between the gate unit 19 and the apex portion of the convex lens surface (second convex lens surface 13) becomes long, and an injection pressure hardly reaches, as a result of which there is a concern that a fine sink may occurs on the convex lens surface (in particular, the apex portion). However, if the conditional expressions (1), (2) are satisfied, it is possible to suppress occurrence of the sink on the convex lens surface (second convex lens surface 13) of the first cemented lens element 10, particularly at the apex portion. Such an effect is particularly remarkable in the first cemented lens element 10 because the second convex lens surface 13 and the flange convex unit 15 protrude in the same direction.

The second cemented lens element 20 is a plastic lens including a concave lens surface (concave lens surface 22) facing the object side L1 (first cemented lens element 10), an opposite convex lens surface (image-side convex lens surface 23) facing the image side L2, and a second flange unit (flange unit 21) surrounding the concave lens surface 22 and the image-side convex lens surface 23 on the outer peripheral side.

More specifically, in a central portion on an object side surface 20a of the object side L1, the concave lens surface 22 is formed. Further, on the object side surface 20a of the flange unit 21, a stepped unit 28 is formed in a region apart by a predetermined length from the concave lens surface 22 in the radially outside direction.

A region on the radially outside of the stepped unit 28 is referred to as "object-side flange outer peripheral surface 24", a region on the radially inside thereof is referred to as the "object-side flange inner peripheral surface 25". In FIG. 5, the object-side flange outer peripheral surface 24 is lowered by one step than the object-side flange inner peripheral surface 25.

The stepped unit 28 includes a tapered surface 27 being an inclined surface. The tapered surface 27 is formed obliquely toward the radially outside and downward from the object-side flange inner peripheral surface 25 to the object-side flange outer peripheral surface 24. In other words, the stepped unit 28 is configured by the object-side flange outer peripheral surface 24, the tapered surface 27, and the object-side flange inner peripheral surface 25.

In a center portion of an image side surface 20b, an image-side convex lens surface 23 projecting toward the image side L2 is formed.

When the first cemented lens element 10 and the second cemented lens element 20 having the above-described configuration are bonded, the tapered surface 17 of the flange convex unit 15 of the first cemented lens element 10 abuts against the tapered surface 27 of the stepped unit 28 of the second cemented lens element 20. That is, the two tapered surfaces 17, 27 function as radial direction abutment surfaces to allow for the radial positioning.

The two tapered surfaces 17, 27 are processed to be the same mirror plane as the lens surfaces (the second convex lens surface 13 and the concave lens surface 22), and because of this, highly accurate positioning is possible. In this case, the two tapered surfaces 17, 27 and the lens surfaces (the second convex lens surface 13 and the concave lens surface 22), which can be processed by the same device, need not be separately specularly processed, so that it is possible to realize the present embodiment with reduced man-hour.

Further, an apex unit of the flange convex unit 15 is formed horizontally in the figure, and when the first cemented lens element 10 and the second cemented lens element 20 are bonded, the apex unit abuts against the object-side flange outer peripheral surface 24 radially outside the stepped unit 28 of the second cemented lens element 20. That is, the apex unit of the flange convex unit 15 and the stepped unit 28 (object-side flange outer peripheral surface 24) function as the optical axial direction abutment surface to allow for the positioning in the optical axis L direction.

The apex unit of the flange convex unit 15 and the stepped unit 28 (object-side flange outer peripheral surface 24) are also specularly processed to allow for the highly accurate positioning, and the apex unit of the flange convex unit 15 and the stepped unit 28 (object-side flange outer peripheral surface 24) need not be separately specularly processed, so that it is possible to suppress the increase in the number of steps to realize the present embodiment.

The flange convex unit 15 (tapered surface 17) of the first cemented lens element 10 and the stepped unit 28 (tapered surface 27) of the second cemented lens element 20 are each formed continuously in the peripheral direction. However, the tapered surface 17, the tapered surface 27, the apex unit of the flange convex unit 15, and the object-side flange outer peripheral surface 24 need not to abut over the entire region in the peripheral direction. Actually, due to the accuracy of molding of the first cemented lens element 10 (the flange convex unit 15 and the tapered surface 17), the second cemented lens element 20 (the stepped unit 28, the tapered surface 27, and the object-side flange outer peripheral surface 24), these components come into contact only at a plurality of position, that is, a part in the peripheral direction, and minute gaps of several μm or less are formed therebetween in other positions. Upon positioning the first cemented lens element 10 and the second cemented lens element 20, as described above, if these components abut (surface contact, point contact) at a plurality of spaced positions, a positional relationship between the first cemented lens element 10 and the second cemented lens element 20 is determined in this state.

That is, in this case, a plurality of locations where the radial direction abutment surface of the first cemented lens element 10 side and the radial direction abutment surface of the second cemented lens element 20 side come into contact with each other are formed at spaced locations. Similarly, a plurality of locations where the optical axial direction abutment surface on the first cemented lens element 10 side and the optical axial direction abutment surface on the second cemented lens element 20 side come into contact with each other are also formed at spaced locations. As a result, a positional relationship in the radial direction and the optical axial direction between the first cemented lens element 10 and the second cemented lens element 20 is determined.

On the other hand, in this case, when the first cemented lens element 10 and the second cemented lens element 20 are bonded, via minute gaps (portions where the flange convex units 15 are present) formed as described above, an adhesive before solidification passes from the radially inside to the outside thereof. When the first cemented lens element 10 and the second cemented lens element 20 are bonded, it is necessary that the thin adhesive layer 50 is uniformly formed in a state where no air bubbles or the like are present particularly between the second convex lens surface 13 on the first cemented lens element 10 side and the concave lens surface 22 on the second cemented lens element 20 side. In this case, after supplying a sufficient amount of adhesive not to form air bubbles between the second convex lens surface 13 and the concave lens surface 22, it is possible to pass the surplus adhesive toward the radially outside via the minute gaps present like this.

Alternatively, the first cemented lens element 10 and the second cemented lens element 20 may be formed into a shape such that, between the tapered surface 17 and the tapered surface 27, and between the apex unit of the flange convex unit 15 and the object-side flange outer peripheral surface 24, a plurality of positions where the surfaces come into contact with each other are formed while the gaps are partially formed, as described above.

In this case, as illustrated in FIG. 5 and FIG. 8, in a state where the first cemented lens element 10 and the second cemented lens element 20 are bonded, radially outside of the optical axial direction abutment surface and the radial direction abutment surface realized by the flange convex unit 15 and the stepped unit 28, an adhesive reservoir unit 55 may be formed as a region where the flange unit 11 (image-side flange outer peripheral surface 14) of the first cemented lens element 10 and the flange unit 21 (object-side flange outer peripheral surface 24) of the second cemented lens element 20 do not abut. This adhesive reservoir unit 55 can receive an extra adhesive and prevent a case where the adhesive is solidified after being leaked out to a flange side surface, causing misalignment when the cemented lens 1 is fitted into the lens barrel 3.

Figure 9:
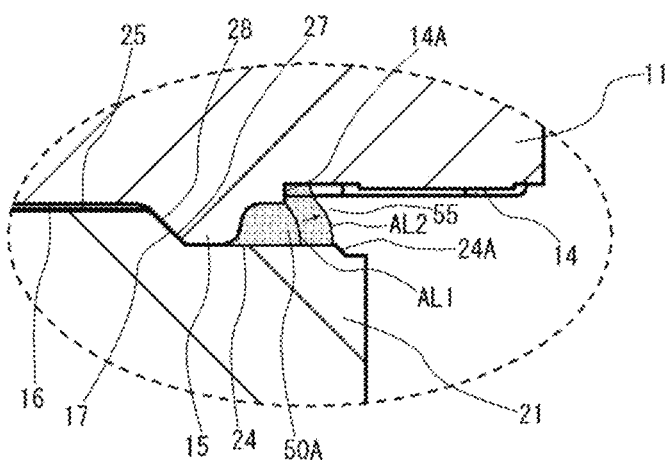
FIG. 9 is an enlarged view illustrating a periphery of an adhesive reservoir unit in a cross section of a cemented lens according to the embodiment.

FIG. 9 is an enlarged sectional view of a structure in the vicinity of the adhesive reservoir unit 55 in FIG. 5, where positions where the left and right are reversed from those in FIG. 8 are illustrated. As described above, the surplus adhesive before solidification is solidified after becoming an end-unit adhesive layer 50A clumped in the adhesive reservoir unit 55. In FIG. 9, the description of the adhesive layer 50 on the radially inside (left side in FIG. 9) of the adhesive reservoir unit 55 is omitted, but actually, the adhesive layer 50 and the end-unit adhesive layer 50A are continuously formed. Here, in order that the adhesive before solidification can be easily retained within the adhesive reservoir unit 55 by surface tension, on the image-side flange outer peripheral surface 14 of the first cemented lens element 10, an adhesive retaining level difference unit 14A is formed, and on the radially outside thereof (right side in FIG. 9), an adhesive retaining level difference unit 24A is formed on the object-side flange outer peripheral surface 24 of the second cemented lens element 20, respectively. Here, the adhesive retaining level difference unit 14A and the adhesive retaining level difference unit 24A are formed as the level difference such that an opening (vertical interval in FIG. 9) of the adhesive reservoir unit 55 abruptly increases at a location where these units 14A, 24A. In this case, if an outflow of adhesive to the radially outside is small, an end unit of the end-unit adhesive layer 50A, which is pinned by the inner adhesive retaining level difference unit 14A, is an adhesive end unit AL1 in FIG. 9. Further, when this outflow becomes large, the end unit, which is pinned by the outer adhesive retaining level difference unit 24A, is an adhesive end unit AL2 in FIG. 9 As a result, the surplus adhesive is prevented from leaking to the outside of the adhesive reservoir unit 55 (for example, a side face of the flange unit 21) for adhesion.

It is noted that similarly to the flange convex unit 15 or the like, the adhesive retaining level difference unit 14A and the adhesive retaining level difference unit 24A do not need to be formed over the entire region in the peripheral direction. Further, as long as the flow of the adhesive in the radially outside can be suppressed by the surface tension of the adhesive before solidification, a level difference other than the level difference unit described above may be created, and a structure other than a simple level difference structure such as the adhesive retaining level difference unit 14A and the adhesive retaining level difference unit 24A may be provided. Similarly to the flange convex unit 15 or the like, such a structure can be easily formed in the first cemented lens element 10 and the second cemented lens element 20.

According to such a configuration, while suppressing the surplus adhesive from leaking to the side surfaces or the like of the flange units 11, 21, a thickness of the adhesive layer 50 formed between the first cemented lens element 10 and the second cemented lens element 20 is made appropriate to tightly bond these elements 10, 20, and it is possible to satisfactorily maintain the optical characteristics of the cemented lens 1. In this case, the thickness of the adhesive layer 50 may be about 5 to 30 μm between the second convex lens surface 13 and the concave lens surface 22, and may be 10 to 50 μm between the image-side flange inner peripheral surface 16 and the object-side flange inner peripheral surface 25 outside of the second convex lens surface 13 and the concave lens surface 22. To effectively use the adhesive reservoir unit 55 as described above to hold the surplus adhesive, a space between the image-side flange outer peripheral surface 14 and the object-side flange outer peripheral surface 24 (inside of the adhesive retaining level difference unit 14A) forming the adhesive reservoir unit 55 is sufficiently widened to 100 to 300 μm, and the end-unit adhesive layer 50A is sufficiently thickened in this space.

(Lens Barrel)

Figure 10A:
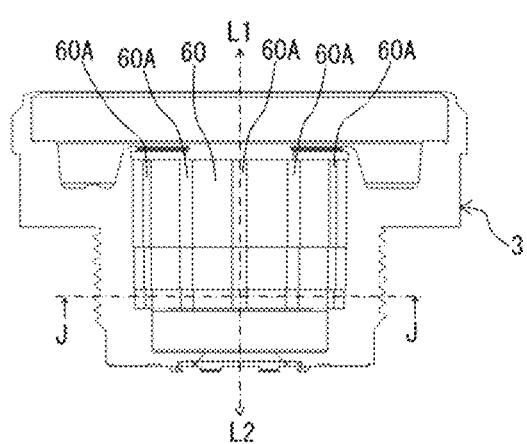
FIG. 10A, 10B are sectional views where the former is a sectional view along an optical axis of a lens barrel (holder) and the latter is a sectional view vertical to the optical axis, in a lens unit according to the embodiment.
Figure 10B:
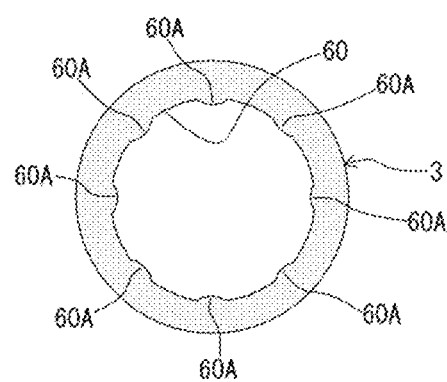

As described above, the cemented lens 1 and the like are fixed in the lens barrel 3 as illustrated in FIG. 1. FIG. 10A, 10B are sectional views, where the former is a sectional view along the optical axis L illustrating a structure of the lens barrel 3, and the latter is a sectional view perpendicular to the optical axis L. In FIG. 10, each lens fixed to the lens barrel 3, the lens holder 110, and the like are not described. In FIG. 10B, a cross section in a J-J direction (position where the first cemented lens element 10 is fixed) in FIG. 10A is illustrated. The inner peripheral surface 60 in a hole unit formed in the lens barrel 3 has a substantially cylindrical surface shape with the optical axis L as its central axis, and on the inner peripheral surface 60, a plurality of press-fit convex units (ribs) 60A, that is, convex units extending along the optical axis L direction (vertical direction in FIG. 10A) and protruding toward a side of the optical axis L (central axis) are formed at equal intervals in the peripheral direction.

Upon fixation of the cemented lens 1 to the lens barrel 3, when the outer peripheral surface of the fifth lens 105 (first cemented lens element 10) is locked with the press-fit convex units 60A, only the fifth lens 105 is directly fixed in a state where the radial positioning is determined, and the sixth lens 106 (second cemented lens element 20), which is bonded and fixed to the fifth lens 105 as described above to determine the positional relationship with the lens barrel 3, is indirectly fixed. Therefore, in FIG. 1, the sixth lens 106 itself is in a non-contact state with the lens barrel 3 including the press-fit convex unit 60A on the inner peripheral surface 60. If the sixth lens 106 also contacts the lens barrel 3, as a result of this, the positional accuracy of the fifth lens 105 or the cemented lens 1 in the lens barrel 3 can not be maintained. Further, in FIG. 9, when the adhesive flowing outward in the radially outside of the adhesive reservoir unit 55 and solidified contacts the press-fit convex unit 60A or the like during such fixation, the positional accuracy of the cemented lens 1 in the lens barrel 3 cannot be maintained. Therefore, the above-described structure capable of suppressing the outflow of the adhesive in the radially outside of the adhesive reservoir unit 55 is particularly preferable in the case of combining the cemented lens 1 and the lens barrel 3 as described above.

On the other hand, according to the configuration illustrated in FIG. 10, a portion against which the lens barrel 3 side abuts on the outer peripheral surface of the fifth lens 105 is limited to a portion against which the press-fit convex unit 60A abuts. Therefore, even if the adhesive adheres to a portion other than this portion on the outer peripheral surface, the positional accuracy of the fifth lens 105 or the cemented lens 1 in the lens barrel 3 is affected only slightly. That is, even if the adhesive flows out to the outside of the adhesive reservoir unit 55, when the above-described lens barrel 3 is used, it is possible to reduce an adverse effect, caused due to the adhesive leaking, on the positional accuracy of the cemented lens 1 in the lens barrel 3.

Similarly, the lens holder 110 is fixed to the lens barrel 3 in a state where the radial positioning is determined by the abutment against the plurality of press-fit convex units 60A on the inner peripheral surface 60, in a state where the fourth lens 104 with which the third lens 103 is bonded is press fitted. At this time, a shape (projection height or the like) of the press-fit convex unit 60A can be set to be effective also for fixing the lens holder 110. Thereafter, as described above, the second lens 102, the first lens 101, and the like are fixed to the lens barrel 3 as described above, and as a result, the lens unit 100 of FIG. 1 is obtained. As described above, in the lens unit 100, the misalignment between each constituent element is suppressed, so that a high optical performance can be obtained. Further, its manufacture is easy.

(Characteristics of Embodiment)

At least an embodiment of the present invention has been described based on the embodiment. Characteristics of the present embodiment are summarized as follows. That is, the lens unit 100 of the present embodiment includes a plurality of lenses (the wide-angle lens 2: the first to sixth lenses 101 to 106) and a cylindrical holder (lens barrel 3) configured to hold a plurality of lenses.

The plurality of lenses (the wide-angle lens 2: the first to sixth lenses 101 to 106) include the cemented lens 1 obtained by bonding the second cemented lens element 20 to the first cemented lens element 10 with the adhesive layer 50 interposed therebetween, and the first cemented lens element 10 is a plastic lens including the convex lens surface (second convex lens surface 13) facing a side of the second cemented lens element 20 and the first flange unit (flange unit 11) surrounding the convex lens surface (second convex lens surface 13) at the outer peripheral side. The second cemented lens element 20 is a plastic lens including the concave lens surface (concave lens surface 22) bonded by the adhesive layer 50 to the convex lens surface (second convex lens surface 13) of the first cemented lens element 10, and the second flange unit (flange unit 21) surrounding the concave lens surface (concave lens surface 22) at the outer peripheral side. One of the first cemented lens element 10 and the second cemented lens element 20 (first cemented lens element 10 in the example of FIG. 5) is in contact with the holder (lens barrel 3), and the other thereof (second cemented lens element 20 in the example of FIG. 5) is not in contact with the holder (lens barrel 3). The first cemented lens element 10 and the second cemented lens element 20 include, in the first flange unit (flange unit 11) and the second flange unit (flange unit 21), the optical axial direction abutment surface (the flange convex unit 15, the object-side flange outer peripheral surface 24, and the tapered surfaces 17, 27) for positioning in the optical axis L direction, and the radial direction abutment surface (tapered surfaces 17, 27) for positioning in the radial direction.

With such a configuration, the first cemented lens element 10 and the second cemented lens element 20 are positioned by the optical axial direction abutment surface and the radial direction abutment surface, and thus, the occurrence of misalignment of lenses by the gap (portion of the adhesive layer 50) can be suppressed and the optical performance can be improved. In addition, one of the first cemented lens element 10 and the second cemented lens element 20 is in contact with the holder (lens barrel 3) and the other is not in contact with the holder, and thus, when fixing the cemented lens 1 to the holder (lens barrel 3), separate forces act on the first cemented lens element 10 and the second cemented lens element 20, allowing for suppression of misalignment of lenses caused by the gap (portion of the adhesive layer 50) and suppression of occurrence of peeling of adhesives (balsam break) caused by the misalignment.

The optical axial direction abutment surface and the radial direction abutment surface formed on the first flange unit (flange unit 11) of the first cemented lens element 10 are comprised of the protruding unit (flange convex unit 15), and the optical axial direction abutment surface and the radial direction abutment surface formed on the second flange unit 21 of the second cemented lens element 20 are composed of the stepped unit 28.

When the protruding unit (flange convex unit 15) of the first cemented lens element 10 (side on which the convex lens surface is provided) is provided, it is possible to increase the thickness in the axial direction of the first flange unit (flange convex unit 15). Therefore, occurrence of a sink on the convex lens surface (second convex lens surface 13) of the first cemented lens element 10, in particular, in the apex portion, can be prevented.

The radial direction abutment surface is comprised of the inclined surfaces (tapered surfaces 17, 27).

As the radial direction abutment surface, the inclined surfaces (tapered surfaces 17, 27) are formed on the first cemented lens element 10 and the second cemented lens element 20, respectively, to abut on each other when the first cemented lens element 10 and the second cemented lens element 20 are bonded, and thus it is possible to facilitate the positioning during a bonding operation.

The present embodiment is characterized in that the first cemented lens element 10 satisfies a conditional expression of: T/C≤3.0, where T denotes the lens thickness and C denotes the flange thickness.

When T/C exceeds an upper limit (3.0), a distance between the gate unit 19 and the apex portion of the convex lens surface (second convex lens surface 13) is long during injection molding of the first cemented lens element 10 being a plastic lens, and thus, an injection pressure hardly reaches, as a result of which there is a concern that a fine sink may occur. If such a conditional expression is satisfied, it is possible to suppress occurrence of the sink on the convex lens surface (second convex lens surface 13) of the first cemented lens element 10, particularly at the apex portion.

The present embodiment is characterized in the first cemented lens element 10 satisfies a conditional expression of: T1/C≤1.5, where T1 denotes a protrusion amount of the convex lens surface (second convex lens surface 13) and C denotes a flange thickness.

When T1/C exceeds an upper limit (1.5), a distance between the gate unit 19 and the apex portion of the convex lens surface (second convex lens surface 13) is long during injection molding of the first cemented lens element 10 being a plastic lens, and thus, an injection pressure hardly reaches, as a result of which there is a concern that a fine sink may occur. If such a conditional expression is satisfied, it is possible to suppress occurrence of the sink on the convex lens surface (second convex lens surface 13) of the first cemented lens element 10, particularly at the apex portion.

The present embodiment is characterized in that the optical axial direction abutment surface and the radial direction abutment surface are the same mirror plane as the lens surface (the second convex lens surface 13 and the concave lens surface 22).

When the optical axial direction abutment surface and the radial direction abutment surface are the same mirror plane as the lens surface (the second convex lens surface 13 and the concave lens surface 22), the bonding accuracy can be improved. Further, these surfaces can be machined by the same process (device) as the formation of the lens surface (the second convex lens surface 13 and the concave lens surface 22), it is possible to realize reduction in man-hour.

The present embodiment is characterized in that radially outside of the optical axial direction abutment surface and the radial direction abutment surface, the adhesive reservoir unit 55 is formed.

Due to the presence of the adhesive reservoir unit 55, the surplus adhesive can be received, and thus, it is possible to prevent a case where the adhesive leaks to the flange side surface to cause the misalignment when the cemented lens 1 is fitted into the lens barrel 3.

The present embodiment is characterized in that at this time, the adhesive reservoir unit 55 is a region sandwiched between the first flange unit (flange unit 11) and the second flange unit (flange unit 21), and the level difference (the adhesive retaining level difference unit 14A and the adhesive retaining level difference unit 24A) is formed on at least one of the surface of the first flange unit (image-side flange outer peripheral surface 14) and the surface of the second flange unit (object-side flange outer peripheral surface 24) in this region.

When such a level difference is created, it is possible to further suppress a case where the adhesive before solidification leaks radially outside of the adhesive reservoir unit 55 due to its own surface tension.

The present embodiment is characterized in that the thickness of the adhesive layer 50 formed between the first cemented lens element 10 and the second cemented lens element 20 is in a range of 5 to 30 μm in the region where the convex lens surface (second convex lens surface 13) and the concave lens surface (concave lens surface 22) are bonded, in a range of 10 to 50 μm in the region where the first flange unit (image-side flange inner peripheral surface 16) and the second flange unit (object-side flange inner peripheral surface 25) are bonded, radially outside of the above region where the convex lens surface (second convex lens surface 13) and the concave lens surface (concave lens surface 22) are bonded and radially inside of the optical axial direction abutment surface and the radial direction abutment surface (flange convex unit 15 and the stepped unit 28), and in a range of 100 to 300 μm in the adhesive reservoir unit 55.

The thickness of the adhesive layer 50 between the convex lens surface (second convex lens surface 13) and the concave lens surface (concave lens surface 22) is in the range of 5 to 30 μm, which is optically the most important point, and the first cemented lens element 10 and the second cemented lens element 20 can be bonded by supplying a sufficient amount of adhesive to the above region to avoid the formation of air bubbles or the like in the adhesive layer 50 in the above region. In this case, the surplus adhesive before solidification sequentially passes to a region radially outside thereof, and when the thickness of the adhesive layer 50 is set to be in a range of 10 to 50 μm in the region where the image-side flange inner peripheral surface 16 and the object-side flange inner peripheral surface 25 are bonded, and in a range of 100 to 300 μm in the adhesive reservoir unit 55 on the outside of the above region, the surplus adhesive can be easily guided to the adhesive reservoir unit 55. As a result, air bubbles, gaps, and peeling in the bonding surfaces between the second convex lens surface 13 and the concave lens surface 22, which cause irregular reflection, clouding, whitening, destruction of the cemented lens, and the like can be suppressed.

The present embodiment is characterized in that the position at which the optical axial direction abutment surface (flange convex unit 15) in the first cemented lens element 10 contacts the optical axial direction abutment surface (stepped unit 28) in the second cemented lens element 20 and the position at which the radial direction abutment surface (tapered surface 17) in the first cemented lens element 10 contacts the radial direction abutment surface (tapered surface 27) in the second cemented lens element 20 are each provided at a plurality of positions respectively spaced apart in the peripheral direction.

In this case, due to the presence of the portions where these surfaces contact with each other, the positional relationship in the optical axis direction and the radial direction between the first cemented lens element 10 and the second cemented lens element 20 can be determined highly accurately. On the other hand, it is possible to particularly easily guide the surplus adhesive as described above to the adhesive reservoir unit 55.

The present embodiment is characterized in that the first cemented lens element 10 is arranged on the object side L1 with respect to the second cemented lens element 20.

When the first cemented lens element 10 having the second convex lens surface 13 is arranged on the object side L1, it is easy to manufacture the cemented lens 1 (particularly, the first cemented lens element 10), and a desired accuracy may be easily obtained.

The lens barrel (holder) 3 is provided with a hole unit with an inner peripheral surface 60 of a substantially cylindrical shape where the optical axis L serves as a central axis, and on the inner peripheral surface 60, a plurality of press-fitting convex units 60A protruding toward the optical axis L direction and extending in the optical axis L direction are formed in the peripheral direction. The present embodiment is further characterized in that in the hole unit, when the outer peripheral surface of one of the first cemented lens element 10 and the second cemented lens element 20 in contact with the lens barrel 3 is locked to the plurality of press-fitting convex units 60A, the first cemented lens element 10 and the second cemented lens element 20 are fixed to the lens barrel 3.

When the plurality of press-fit convex units 60A are used to lock the outer peripheral surface of one of the first cemented lens element 10 and the second cemented lens element 20 for fixation, the above cemented lens 1 can be highly accurately fixed to the lens barrel 3 in the radial direction. In this case, even if the adhesive is attached to a part of the outer peripheral surface, it is possible to reduce an adverse effect of the adhesive on the accuracy.

Although at least an embodiment of the present invention has been described based on the embodiment, it is to be understood that this embodiment is merely an example, and it is to be understood to those skilled in the art that various modifications can be made to combinations of the respective constituent elements and these modifications are in the scope of the present invention.

(Modification of Cemented Lens)

Figure 11A:
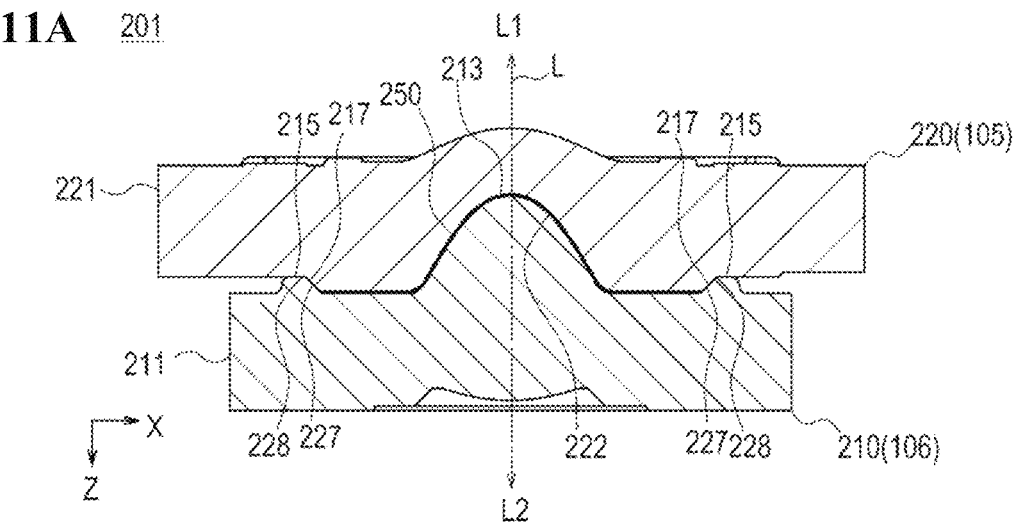
FIG. 11A, FIG. 11B, and FIG. 11C are each sectional views of cemented lenses according to a modification of the embodiment.
Figure 11B:
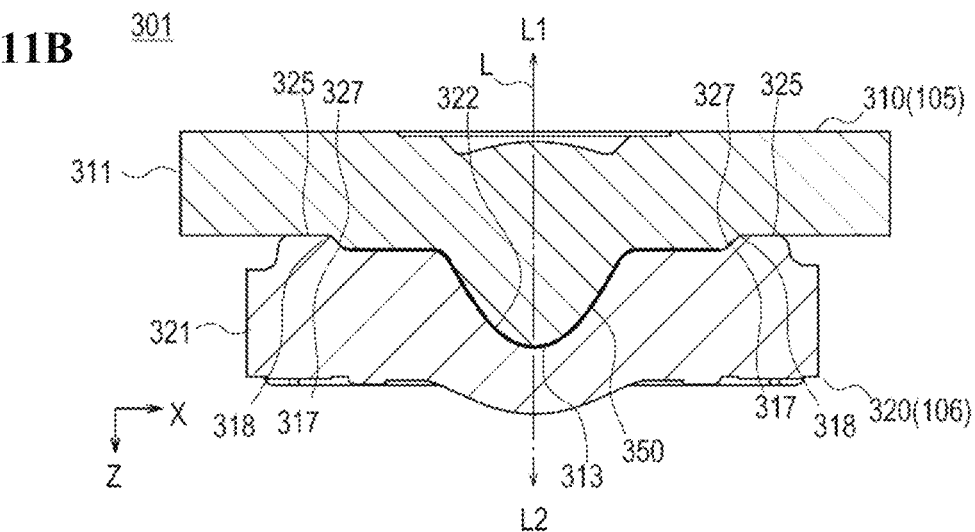
Figure 11C:
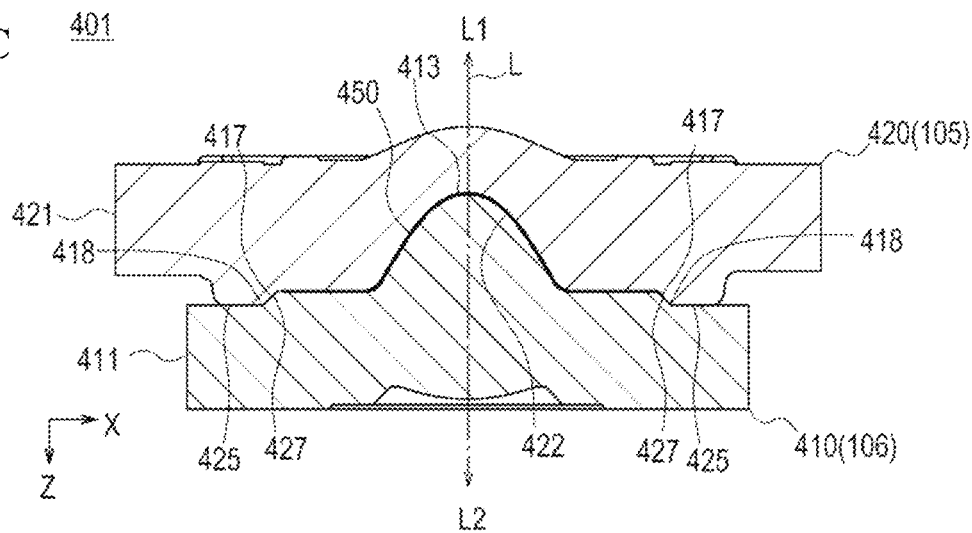

FIG. 11A, FIG. 11B, and FIG. 11C are each sectional views illustrating cemented lenses 201, 301, 401 according to a modification.

In the cemented lens 1 of the above embodiment, the first cemented lens element 10 is arranged on the object side L1 and the second cemented lens element 20 is arranged on the image side L2, and the flange convex unit 15 and the stepped unit 28 functioning as the optical axial direction abutment surface and the radial direction abutment surface are formed in the first cemented lens element 10 and the second cemented lens element 20, respectively. This is not limiting, and configurations provided in the cemented lenses 201, 301, 401 illustrated as the following modification may be accepted. In either case, of the two lens elements, a side having the convex lens surface is defined as a "first lens element", and a side having the concave lens surface to be fitted with the convex lens surface, with the adhesive layer interposed therebetween, is defined as a "second lens element".

In a cemented lens 201 illustrated in FIG. 11A, a first cemented lens element 210 having a second convex lens surface 213 is arranged on the image side L2, and a second cemented lens element 220 having a concave lens surface 222 is arranged on the object side L1. That is, the second cemented lens element 220 is a lens correspond to the fifth lens 105, and the first cemented lens element 210 is a lens corresponding to the sixth lens 106. Therefore, the second cemented lens element 220 at an upper part in FIG. 11A is larger in diameter than the first cemented lens element 210. In addition, as the structure functioning as the optical axial direction abutment surface and the radial direction abutment surface, similarly to the cemented lens 1 illustrated in FIG. 5 and the like, a flange convex unit 215 is arranged in a flange unit 211 of the first cemented lens element 210, and a stepped unit 228 is arranged in a flange unit 221 of the second cemented lens element 220. An abutment structure of tapered surfaces 217, 227 is similar to that described above.

In a cemented lens 301 illustrated in FIG. 11B, similarly to the cemented lens 1 illustrated in FIG. 5 and the like, a first cemented lens element 310 having a second convex lens surface 313 is arranged on the object side L1 and a second cemented lens element 320 having a concave lens surface 322 is arranged on the image side L2. That is, the first cemented lens element 310 is a lens correspond to the fifth lens 105, and the second cemented lens element 320 is a lens corresponding to the sixth lens 106. Therefore, the first cemented lens element 310 at an upper part in FIG. 11B is larger in diameter than the second cemented lens element 320. In addition, as the structure functioning as the optical axial direction abutment surface and the radial direction abutment surface, contrary to the cemented lens 1 illustrated in FIG. 5 and the like, a flange convex unit 325 is arranged in a flange unit 321 of the second cemented lens element 320, and a stepped unit 318 is arranged in a flange unit 311 of the first cemented lens element 310. An abutment structure of tapered surfaces 317, 327 is similar to that described above.

In a cemented lens 401 illustrated in FIG. 11C, similarly to the cemented lens 201 illustrated in FIG. 11A, a first cemented lens element 410 having a second convex lens surface 413 is arranged on the image side L2 and a second cemented lens element 420 having a concave lens surface 422 is arranged on the object side L1. That is, the second cemented lens element 420 is a lens correspond to the fifth lens 105, and the first cemented lens element 410 is a lens corresponding to the sixth lens 106. Therefore, the second cemented lens element 420 at an upper part in FIG. 11C is larger in diameter than the first cemented lens element 410. In addition, as the structure functioning as the optical axial direction abutment surface and the radial direction abutment surface, contrary to the cemented lens 1 illustrated in FIG. 5 and the like, a flange convex unit 425 is arranged in a flange unit 421 of the second cemented lens element 420, and a stepped unit 418 is arranged in a flange unit 411 of the first cemented lens element 410. An abutment structure of tapered surfaces 417, 427 is similar to that described above.

In the modification illustrated in FIG. 11A, FIG. 11B, and FIG. 11C, similarly to the above, the adhesive reservoir unit 55 illustrated in FIG. 9 and a configuration related thereto, and the lens barrel 3 illustrated in FIG. 10 can be similarly used.

It is noted that in the above embodiment, as illustrated in FIG. 1, the fifth lens 105 and the sixth lens 106 serve as the cemented lens 1 and are arranged closest to the image side L2, but the present invention is not limited thereto. For example, the third lens 103 and the fourth lens 104 of FIG. 1 may be a plastic lens, and the resultant lens may have a cemented lens configuration similar to the cemented lens 1 (that is, a configuration in which the optical axial direction abutment surface and the radial direction abutment surface formed as tapered surfaces are used when the first, second cemented lens elements 10, 20 are bonded).

In the above embodiments, of the first cemented lens element 10 and the second cemented lens element 20, the first cemented lens element 10, which is larger in diameter, is directly fixed to the lens barrel 3. However, the sizes and the modes of the first cemented lens element and the second cemented lens element are appropriately set according to a purpose, and the configuration of the lens barrel is appropriately set accordingly. In this case, a configuration may be that the first cemented lens element or the second cemented lens element, whichever is smaller in diameter, is directly fixed to the lens barrel, and whichever is larger in diameter, does not directly contact the lens barrel. That is, in the cemented lens configured by bonding the first cemented lens element and the second cemented lens element, which cemented lens element side is directly fixed to the lens barrel (holder) is appropriately set, and in either case, it is obvious that the same effect as described above can be obtained.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:
1. A lens unit comprising:
   a plurality of lenses; and
   a cylindrical holder configured to hold the plurality of lenses, wherein
   the plurality of lenses comprises a cemented lens comprising a second cemented lens element bonded to a first cemented lens element with an adhesive layer interposed therebetween,
   the first cemented lens element is a plastic lens comprising a convex lens surface facing a side of the second cemented lens element, and a first flange unit surrounding the convex lens surface at an outer peripheral side,
   the second cemented lens element is a plastic lens comprising a concave lens surface bonded by the adhesive layer onto the convex lens surface of the first cemented lens element, and a second flange unit surrounding the concave lens surface at an outer peripheral side,
   one of the first cemented lens element and the second cemented lens element is in contact with the holder and the other of the first cemented lens element and the second cemented lens element is not in contact with the holder, and the first cemented lens element and the second cemented lens element comprise, in the first flange unit and the second flange unit, an optical axial direction abutment surface for positioning in the optical axial direction and a radial direction abutment surface for positioning in a radial direction, wherein the optical axial direction abutment surface and the radial direction abutment surface formed on the first flange unit of the first cemented lens element comprise a protruding unit, and the optical axial direction abutment surface and the radial direction abutment surface formed on the second flange unit of the second cemented lens element comprise a stepped unit.

2. The lens unit according to claim 1, wherein the radial direction abutment surface comprises an inclined surface.

3. The lens unit according to claim 2, wherein an adhesive reservoir unit is formed radially outside of the optical axial direction abutment surface and the radial direction abutment surface.

4. The lens unit according to claim 3, wherein the adhesive reservoir unit is a region sandwiched between the first flange unit and the second flange unit and a level difference is provided on at least any one of a surface of the first flange unit and a surface of the second flange unit in the region.

5. The lens unit according to claim 1, wherein the first cemented lens element satisfies a conditional expression of T/C≤3.0, where T denotes a lens thickness and C denotes a flange thickness.

6. The lens unit according to claim 5, wherein the first cemented lens element satisfies a conditional expression of T1/C≤1.5, where T1 denotes a protrusion amount of the convex lens surface and C denotes a flange thickness.

7. The lens unit according to claim 1, wherein the first cemented lens element satisfies a conditional expression of T1/C≤1.5, where T1 denotes a protrusion amount of the convex lens surface and C denotes a flange thickness.

8. The lens unit according to claim 1, wherein the optical axial direction abutment surface and the radial direction abutment surface are the same mirror plane as the convex lens surface or the concave lens surface.

9. The lens unit according to claim 8, wherein an adhesive reservoir unit is formed radially outside of the optical axial direction abutment surface and the radial direction abutment surface.

10. The lens unit according to claim 9, wherein the adhesive reservoir unit is a region sandwiched between the first flange unit and the second flange unit and a level difference is provided on at least any one of a surface of the first flange unit and a surface of the second flange unit in the region.

11. The lens unit according to claim 1, wherein an adhesive reservoir unit is formed radially outside of the optical axial direction abutment surface and the radial direction abutment surface.

12. The lens unit according to claim 11, wherein the adhesive reservoir unit is a region sandwiched between the first flange unit and the second flange unit and a level difference is provided on at least any one of a surface of the first flange unit and a surface of the second flange unit in the region.

13. The lens unit according to claim 11, wherein a thickness of the adhesive layer formed between the first cemented lens element and the second cemented lens element is in a range of 5 to 30 μm in a region in which the convex lens surface and the concave lens surface are bonded, in a range of 10 to 50 μm in a region in which the first flange unit and the second flange unit are bonded, radially outside of a region in which the convex lens surface and the concave lens surface are bonded and radially inside of the optical axial direction abutment surface and the radial direction abutment surface, and in a range of 100 to 300 μm in the adhesive reservoir unit.

14. The lens unit according to claim 1, wherein a position at which the optical axial direction abutment surface in the first cemented lens element contacts the optical axial direction abutment surface in the second cemented lens element and a position at which the radial direction abutment surface in the first cemented lens element contacts the radial direction abutment surface in the second cemented lens element are each provided at a plurality of positions respectively spaced apart in a peripheral direction.

15. The lens unit according to claim 1, wherein the first cemented lens element is arranged on an object side relative to the second cemented lens element.

16. The lens unit according to claim 1, wherein the holder is provided with a hole unit with an inner peripheral surface of a substantially cylindrical shape where the optical axis serves as a central axis, and on the inner peripheral surface, a plurality of press-fit convex units protruding toward the optical axis side and extending in the optical axial direction are formed in a peripheral direction, in the hole unit, when an outer peripheral surface of one of the first cemented lens element and the second cemented lens element in contact with the holder is locked to the plurality of press-fit convex units, the first cemented lens element and the second cemented lens element are fixed to the holder.

* * * * *